No. 870,665. PATENTED NOV. 12, 1907.
A. F. COLGREN.
TRANSMISSION GEAR.
APPLICATION FILED DEC. 28, 1906.

2 SHEETS—SHEET 1.

Witnesses:
Inventor,
A. F. Colgren,
by Rummler & Rummler,
his Attorneys.

No. 870,665. PATENTED NOV. 12, 1907.
A. F. COLGREN.
TRANSMISSION GEAR.
APPLICATION FILED DEC. 28, 1906.

2 SHEETS—SHEET 2.

UNITED STATES PATENT OFFICE.

ANDREW FREDERICK COLGREN, OF CHICAGO, ILLINOIS.

TRANSMISSION-GEAR.

No. 870,665.　　　　　Specification of Letters Patent.　　　Patented Nov. 12, 1907.

Application filed December 28, 1906. Serial No. 349,783.

*To all whom it may concern:*

Be it known that I, ANDREW FREDERICK COLGREN, a citizen of the United States of America, and a resident of Chicago, in the county of Cook and State of Illinois, have invented certain new and useful Improvements in Transmission-Gears, of which the following is a specification.

This invention relates to power transmission gears and is particularly applicable to mechanism for regulating the speed of motor-driven vehicles.

Figure 1:
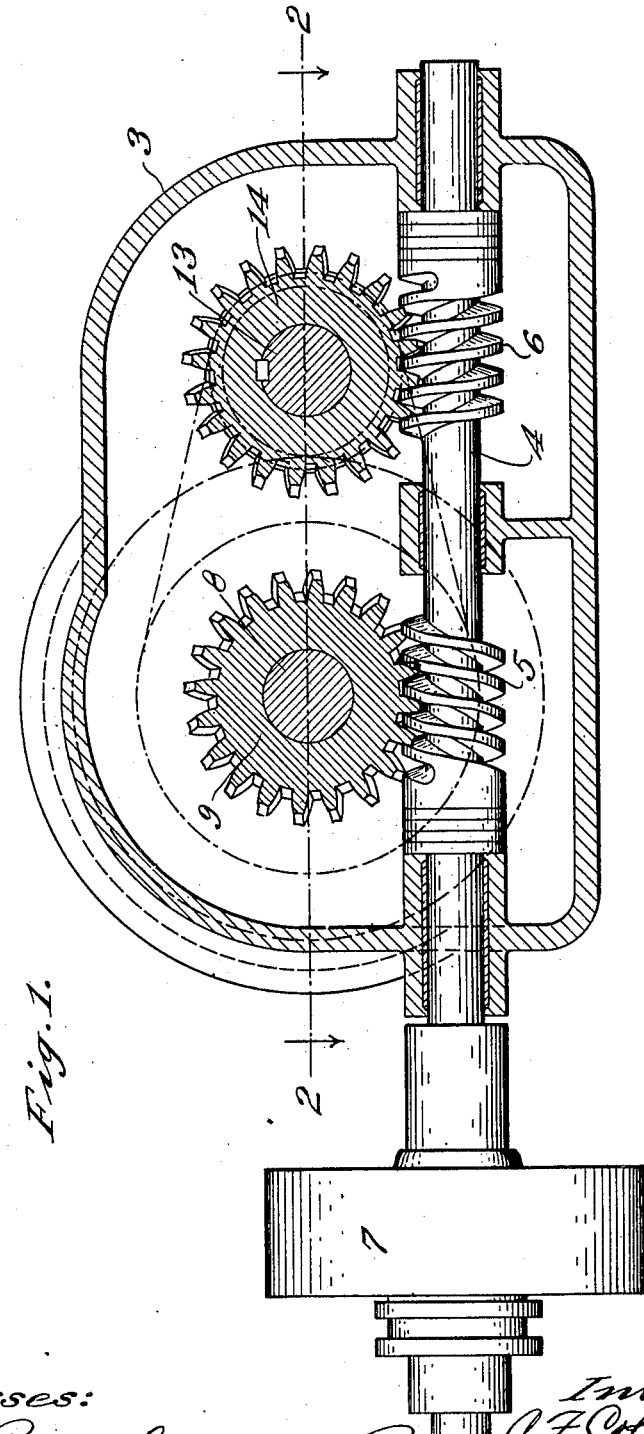
Figure 2:
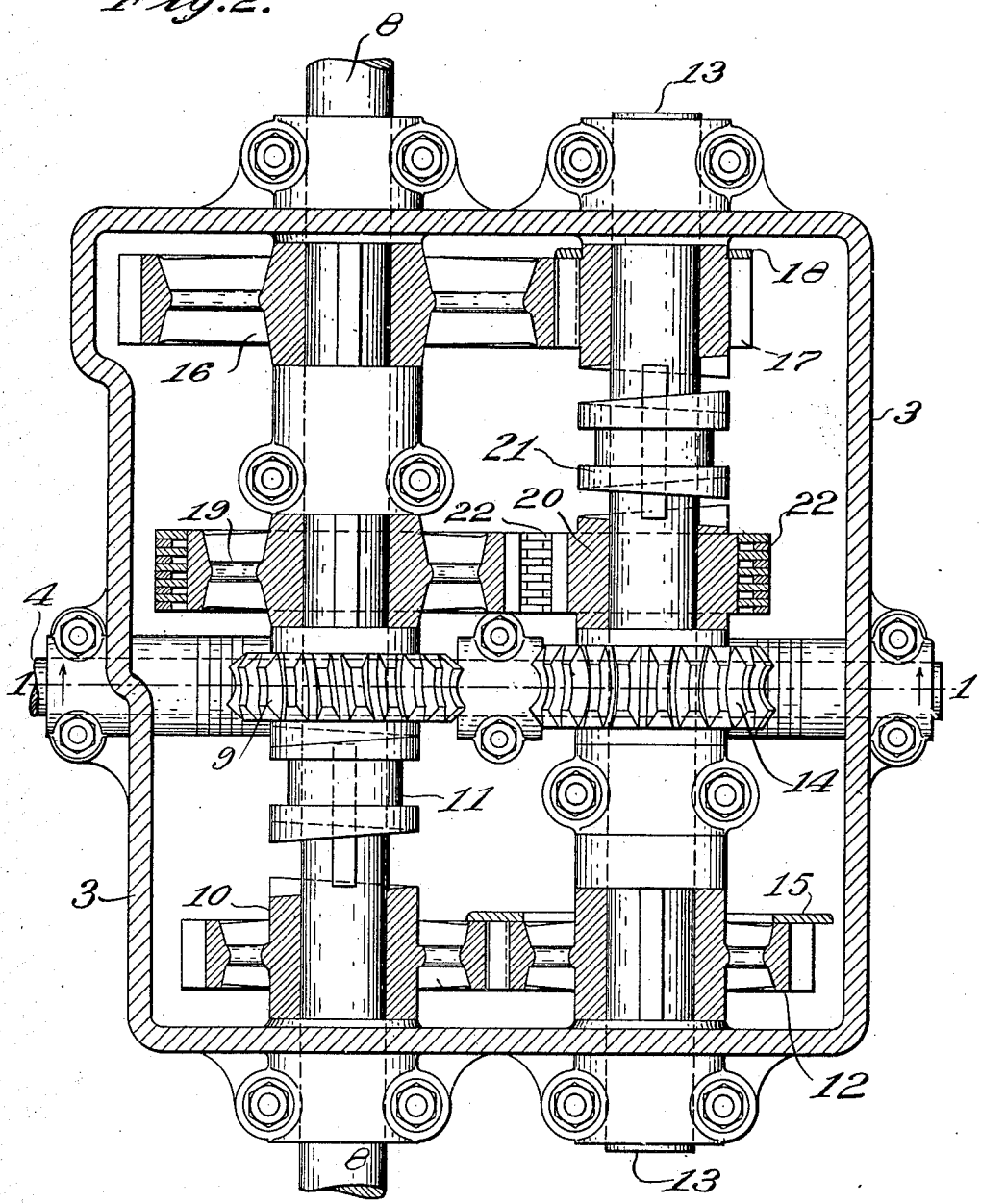

The main objects of this invention are to provide an improved form of power transmission mechanism which is compact, strong, durable, and particularly suitable for driving heavy auto-trucks; and to provide a power transmission in which the driving gears are always in mesh with each other so that the possibility of breakage of gear teeth is greatly reduced. These objects are accomplished by the device shown in the accompanying drawings, in which:

Figure 1 is a section taken along the driving shaft of a transmission gear constructed according to this invention. The gears which connect the shafts 8 and 13, both in the foreground and in the background of the plane of section are indicated by dotted pitch lines. Fig. 2 is a horizontal section on the line 2—2 of Fig. 1, the line 1—1 indicating the plane on which the section shown in Fig. 1 is taken.

In the construction shown in the drawings, the system of gearing is entirely inclosed in a casing 3 which is adapted to hold oil in its lower part for maintaining perfect lubrication of all the parts. The driving shaft 4 is provided with two worms 5 and 6 and is also preferably provided with a clutch 7 by means of which the transmission system may be entirely disconnected from the motor so that the transmission clutches, which will be herein described, may be thrown into and out of mesh with their respective driving members while the vehicle is in motion and without injury to the clutches.

The driven or jack shaft 8 which in a motor driven vehicle would be connected with the driving wheels of the vehicle, is connected with the driving shaft 1 by means of a worm wheel 9 which meshes with the worm 5 and is loose on the shaft 8. The driven shaft 8 also carries a loose gear 10. A clutch member 11 is splined to the shaft 8 and adapted to be moved into clutching engagement with either the gear 10 or the worm-wheel 9. The gear 10 meshes with a gear 12 of equal diameter carried by a countershaft 13 which is arranged in parallel relation with the driven shaft 8 and which also carries a worm-wheel 14 which meshes with the worm 6. The worm-wheel 14 and the gear 12 are both keyed to the shaft 13. The gear 12 is preferably provided with a shroud 15 which prevents the gear 10 from slipping longitudinally of the shaft. The driven shaft 8 has thereon a second gear 16 which meshes with a pinion 17 on the shaft 13. The gear 16 is rigid on the shaft 8 and the pinion 17 is loose on the shaft 13, the latter being prevented from shifting by means of a shroud 18.

The shafts 8 and 13 also carry a pair of sprocket wheels 19 and 20, the wheel 19 being rigid on its shaft and the wheel 20 being loose on the countershaft. These sprocket members are preferably gears which do not mesh with each other but which are connected by means of a link belt, preferably of the form commonly known as the "silent" chain drive which consists of a series of links having gear teeth projecting therefrom for meshing with the teeth on ordinary gear wheels. The shaft 13 has a clutch member 21 splined thereon and movable into and out of operative engagement with either the pinion 17 or the sprocket 20, the clutch member 21 being of such length that it may be moved to a position where it will clear either the pinion 17 or the sprocket wheel 20 and may be thrown into engagement with but one at a time. The mechanism which operates the clutches 11 and 21 is not shown in the drawings but should be so arranged that neither of said clutches may be shifted into its engaged position while the other clutch is in engagement.

The worms 5 and 6 are of respectively left and right-hand pitch so that the counter shaft 13 will be driven in the opposite direction to the normal rotation of the worm-wheel 9 on the driven shaft. The worm 6 has one thread while the worm 5 has two threads. The spacing of the successive convolutions are however the same in each case so that the teeth on the worm wheels 9 and 14 may be of the same size and spacing and may therefore be of equal strength and each capable of resisting the full power of the motor.

The operation of the device shown is as follows: When the clutches are in the position shown in Fig. 2, the worm wheel 9 will be connected through the clutch 11 with the driven shaft 8 which will receive power directly from the driving shaft 4 through its worm and worm-wheel connection therewith. This will drive the driven shaft 8 at its greatest speed ahead. The counter shaft 13 is continuously driven. When therefore the clutch member 11 is shifted out of engagement with the worm wheel 9 and into engagement with the gear 10, the driven shaft 8 will be driven by the worm 6, the worm-wheel 14, and the gears 10 and 12. As the gears 10 and 12 are of the same pitch, the speed of the shaft 8 will depend upon the pitch of the worm 6. This is half the pitch of the worm 5 so that the driven shaft 8 is now driven at one-half of its maximum speed. When the clutch member 11 is shifted to a position clear of both the worm wheel 9 and the gear 10, and the clutch member 21 is thrown into mesh with the pinion 17, then the shaft 8 will be driven through the gears 17 and 16, and the speed of the shaft 8 will be still further reduced to correspond with the pitch ratios of the gears 16 and 17. If, for example, the pitch diameter of the pinion 17 is one-half of that of the gear 16, then the speed of the shaft 8 would be one-fourth of its maximum speed, the speed being reduced one-half by the worm 6 and being again reduced one-half by the gears 16 and 17. When the clutch member 21 is thrown into mesh with the sprocket 20, the shaft 8 will be driven through the belt 22 and will rotate in the same direction as the countershaft 13; that is, the vehicle will be driven in a reverse direction and at a slow speed. This speed would be one quarter of the maximum speed ahead if the sprocket 20 were one-half the diameter of the sprocket 19.

What I claim as my invention and desire to secure by Letters Patent is:—

1. A transmission gear comprising a driving shaft having thereon two worms in alinement with each other, a driven shaft extending transversely of said driving shaft, a worm-wheel thereon meshing with one of the worms on said driving shaft, a counter-shaft disposed in parallel relation to said driven shaft, a worm-wheel thereon meshing with the other worm on said driving shaft, a plurality of pairs of gears of different pitch ratios connecting said driven and counter-shafts, and clutches arranged to permit said driven shaft to receive power directly from its worm and wheel connection with said driving shaft or through said counter-shaft and any of said pairs of gears.

2. A transmission gear comprising a driving shaft having thereon two worms of different pitch in alinement with each other, a driven shaft extending transversely of said driving shaft, a worm-wheel thereon meshing with one of the worms on said driving shaft, a counter-shaft disposed in parallel relation to said driven shaft, a worm-wheel thereon meshing with the other worm on said driving shaft, a plurality of pairs of gears of different pitch ratios connecting said driven and counter-shafts, and clutches arranged to permit said driven shaft to receive power directly from its worm and wheel connection with said driving shaft or through said counter-shaft and any of said pairs of gears.

3. A transmission gear comprising a driving shaft having thereon two worms in alinement with each other, a driven shaft extending transversely of said driving shaft, a worm-wheel thereon meshing with one of the worms on said driving shaft, a counter-shaft disposed in parallel relation to said driven shaft, a worm-wheel thereon meshing with the other worm on said driving shaft, a pair of gears respectively mounted on said driven and counter-shafts and meshing with each other, a pair of sprocket wheels respectively mounted on said driven and counter-shafts, a belt connecting them, and clutches arranged to permit said driven shaft to be driven directly through its worm and wheel conection with said first shaft or indirectly through said counter-shaft and said gears or said sprocket wheels.

4. The combination of a driven shaft, a counter shaft parallel therewith, a driving shaft disposed transversely to said driven and counter-shafts and having means for directly and separately driving said driven and counter-shafts, a plurality of pairs of gears of different pitch ratios connecting said driven and counter-shaft, and clutches arranged to permit said driven shaft to receive power directly from said driving shaft or indirectly through said countershaft and any pair of said gears, at the will of the operator.

5. The combination of a driving shaft having two worms in alinement with each other, a driven shaft, a worm wheel mounted thereon meshing with one of said worms, a counter-shaft, a worm-wheel keyed thereon meshing with the other of said worms, a gear loosely mounted on said driven shaft, a second gear rigid on said counter shaft and having driving connection with said first gear, and a clutch member splined to said driven shaft and adapted to alternately connect said shaft with its worm wheel or gear.

6. The combination of a driving shaft having thereon a pair of worms, a driven shaft, a worm-wheel thereon meshing with one of said worms, a counter shaft, a worm-wheel thereon meshing with the other of said worms, one of said worm-wheels being rigid on its shaft and the other being loose on its respective shaft, a plurality of pairs of driving members connecting said driven and counter shafts and having different pitch ratios for driving said shafts at different relative speeds, and clutches controlling the operation of said loose worm wheel and each of said pairs of driving members so that any pair may be thrown into or out of operative conection with said driven shaft.

Signed at Chicago this 26th day of December 1906.

ANDREW FREDERICK COLGREN.

Witnesses:
  E. A. RUMMLER,
  L. A. SMITH.